United States Patent [19]

Meunier et al.

[11] Patent Number: 4,532,046

[45] Date of Patent: Jul. 30, 1985

[54] METHOD FOR HINDERING THE SCALING BY WATERS

[75] Inventors: Gilles Meunier, Mazerolles; Lino Vio, Pau, both of France

[73] Assignee: Societe Nationale Elf Aquitaine, Courbevoie, France

[21] Appl. No.: 526,026

[22] Filed: Aug. 24, 1983

[30] Foreign Application Priority Data

Nov. 24, 1982 [FR] France ............................ 82 19662

[51] Int. Cl.$^3$ .............................................. C02F 5/12
[52] U.S. Cl. .................................... 210/698; 210/701; 252/180
[58] Field of Search .............................. 210/698–701; 252/180, 181

[56] References Cited

U.S. PATENT DOCUMENTS

| 3,280,081 | 10/1966 | LaCombe et al. | 210/734 |
| 3,285,886 | 11/1966 | Gunderson et al. | 252/180 |
| 3,965,027 | 6/1976 | Boffardi et al. | 252/180 |
| 4,332,711 | 6/1982 | Kooymans et al. | 523/402 |
| 4,432,884 | 2/1984 | Kawasaki et al. | 210/701 |

FOREIGN PATENT DOCUMENTS

| 0012463 | 6/1980 | European Pat. Off. | |
| 1414918 | 11/1975 | United Kingdom | 210/701 |

Primary Examiner—Peter Hruskoci
Attorney, Agent, or Firm—Burgess, Ryan & Wayne

[57] ABSTRACT

A method for eliminating the scaling by deposit of alkaline earth compounds from an aqueous medium; to said medium is added an agent comprising a water-soluble polymer bearer of hydroxamic groups attached to a linear hydrocarbon chain.

16 Claims, No Drawings

METHOD FOR HINDERING THE SCALING BY WATERS

This invention concerns a method for eliminating the scaling due to the deposit of alkaline earth compounds on the walls of conduits, receptacles, apparatus, or different enclosed spaces, said compounds originating from waters that contain them. The invention comprises a novel type of agent for use in the method. More specially the invention refers to anti-scaling agents that make it possible to prevent the formation of calcium-compound deposits originating from calcareous waters including sea water.

Scaling is a phenomenon that causes trouble in industry, ever since its birth it can be said, in all cases where more or less calcareous waters come into play. Thus, there have been searched and found numerous agents for preventing the formation of calcareous deposits on conduits or different containers. Known already is, for instance, the use of phosphates, phosphonates, acrylates, aryl or alkyl sulfonates of alkaline metals, etc., each one of which has a certain field of use. However, most of these adjuvants have to be used in relatively large amounts and—on the other hand—they require a certain pH that may not be desirable in specific cases. It is known, for example, that in the case of sea water the scaling caused by calcium or barium salts, specially sulfates and carbonates, is reduced only in part by agents such as alkaline phosphonates or polyacrylates.

This invention provides a method that uses a novel type of adjuvant that acts efficiently even in very small amounts; another advantage of these novel agents is that they do not require a particular pH and remain effective within a wide pH range on both sides of neutrality; in addition, the novel agents according to the invention remain active even in the presence of strong salinity of the water, which makes them very useful in the treatment of sea water.

The novel anti-scaling agents according to the invention are water-soluble polymers bearer of hydroxamic groups attached to a linear hydrocarbon chain. These polymers can be represented by the formula.

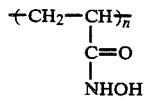   (1)

The polyolefinic chain —CH$_2$—CH— can be of the polyvinylic, polyacrylic, polybutenylic, etc. type, but may also include patterns of copolymers such as acrylic, maleic, vinylic acids, esters, or salts, in particular vinyl acetate, vinyl pyrrolidone, butadiene, styrene, or acrylonitrile.

In the anti-scaling agents according to the invention, the hydroxamic group can be wholly or partly replaced by a corresponding thio derivative, that is, a group of the type

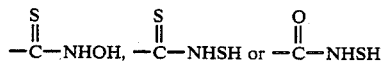

A specially useful form of the hydroxamic polymers is one where the hydrocarbon chain bears, at the same time, hydroxamic groups of the formula (1) and amide groups of the formula

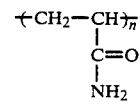   (2)

The anti-scaling activity of the hydroxamic functions is not hindered by the presence of amide functions, while the preparation of these mixed hydroxamic and amidic compounds is easy, which constitutes an undeniable industrial advantage. It is in fact possible to manufacture with good yield polymers that bear the two kinds of groups in question (1) and (2) by heating a polyacrylamide with hydroxylamine.

The precipitation of alkaline earth compounds in water is best prevented when in the hydroxamic polymer used 5 to 90% of the functional groups are hydroxamic groups (1), the rest being amide groups (2); but the proportions preferred are from 15 to 70% hydroxamic groups and 30 to 85% amide groups.

Although the invention can be carried out with polymers of very different degrees of polymerization, preferrably from 5 to 600, it is preferable to use agents that are easily soluble in water to which they only impart of slight increase in viscosity, which is obtained with polymerization degrees of from 10 to 230 and preferrably from 12 to 140.

When the hydrocarbon chain is of the simple type shown in formulae (1) and (2), a medium molecular weight polymer can be used, corresponding to the polymerization degrees indicated above, and having a molecular weight between 500 and 50,000, preferably between 1,000 and 20,000, and most preferrably from 1,200 to 12,000.

In the polymers described, 1 or the 2 hydrogen atom in the —NHOH group can be replaced by alkyl or aryl radicals, preferably alkyl having one to 6 carbon atoms phenyl. It is thus possible to have, for example, polymers of the type

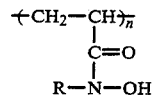

wherein R can be CH$_3$, —C$_3$H$_7$, —C$_6$H$_{13}$, —C$_6$H$_5$, —C$_6$H$_5$(CH$_2$)$_n$, and the like.

The anti-scaling effects of the agents according to the invention are exerted regardless of the cause of the tendency to precipitate of an alkaline earth compound. They thus come into play when a precipitating ion such as SO$_4^{--}$ or CO$_3^{--}$ is introduced into water containing Ca$^{++}$ and/or Ba$^{++}$ cations. They likewise appear when the precipitation is due to temperature or pressure changes. It follows herefrom that the agents according to the invention are very useful for preventing the scaling and plugging of pipelines and of cocks and valves, the warping of filters and porous objects that can no longer occur as a consequence of keeping, in the water, compounds that have a tendency to precipitate. One particular application is where sea water is injected into a deposit containing Ca and/or Ba in substantial amounts. Since the contents of SO$_4^{--}$ ion is on the order of 2.5 g/l, there are great risks of precipitation of the insoluble alkaline earth sulfate, of clogging the formation and scaling of the pipelines. Sea water is often reinjected, specially in petroleum deposits in the sea:

therefore, a remarkable technological progress is achieved in preventing said precipitation by the addition of a hydroxamic polymer according to the invention.

The concentration of the hydroxamic polymer in the aqueous medium necessary to prevent the precipitation of alkaline earth and/or limiting the increase in the size of the crystals, depends on the nature of the treated medium and on the concentration of precipitable elements. In most practical cases the concentration of hydroxamic polymer is in the range of about 1 to 50 mg/l. In the case of calcium compounds, where there is the risk of their depositing in the form of sulfate, from 2 to 5 mg of polymer are generally sufficient to prevent the precipitation of 100 mg of Ca.

The invention is illustrated without being limited by the examples that follow.

EXAMPLES 1

The anti-scaling agent is a polymer obtained from polyacrylamide by replacing 25% of the amide groups by hydroxamic groups. The average molecular weight of the polymer is 7,500, which corresponds to a polymerization degree of about 100. Two aqueous solutions were prepared from distilled water for containing the following salts:

Solution A: $CaCl_2 2H_2O$, 64.9 g/l + $MgCl_2$, 0.5 g/l
Solution B: $Na_2SO_4$, 62.7 g/l.

In a 500 ml flask there are introduced 400 ml distilled water to which 50 ml of solution A are progressively added while stirring and then 50 ml of solution B; in a flask, which serves as control, nothing more is added, while in the other flasks there is added a certain amount of the anti-scaling agent mentioned above. The mixtures are well homogenized and the stoppered flasks are left to stand for 7 days.

A few ml of supernatant liquid are then drawn out and the calcium is determined therein. Here are the results of these tests.

| | CONTROL | AGENT OF THE INVENTION | |
|---|---|---|---|
| Content - anti-tartar agent, mg/l | 0 | 0.2 | 1 |
| Calcium precipitate, mg/l | 39 | 34 | 0 |

It can be seen that starting from 0.2 mg/l hydroxamic polymer the amount of calcium substantially decreases and with 1 mg of polymer the precipitation is completely hindered. Since without adjuvant (control test) 39 mg Ca per liter are deposited, the above experiment shows that 1:39, that is 2.56 mg polymer for 100 mg precipitable Ca, have sufficed for entirely checking the precipitation.

EXAMPLES 2 TO 7

Similar tests to that of Example 1 have been carried out with the same type of polyhydroxamic acid (PHA), but with variable molecular weights and different contents of hydroxamic groups.

1 mg PHA/l water has been added in each one of the tests. The table that follows indicates the results obtained, that is the number of mg of Ca deposited in 7 days. In this table hx designates the proportion in percent of hydroxamic groups present in relation to the total of hydroxamic and amidic groups.

When hx=0, it corresponds to the starting polyacrylamide that does not contain hydroxamic groups.

| | | Average Molecular Weight | | | |
|---|---|---|---|---|---|
| Ex | hx % | 800 | 1500 | 7500 | 20200 |
| 2 | 0 | 12 | 8 | 15 | 23 |
| 3 | 6 | 4 | 2 | 4 | 11 |
| 4 | 15 | 1 | 0 | 0 | 4 |
| 5 | 39 | 0 | 0 | 0 | 2 |
| 6 | 60 | 0 | 0 | 0 | 1 |
| 7 | 85 | 0 | 0 | 0 | 3 |

The results show that the hydroxamic groups have more antiscaling activity than that of the amide groups (see Example 2). Compositions with molecular weights of from 1,500 to 7,500 have the widest margin of activity from variable hx's.

EXAMPLE 8

Precipitation of barium sulfate by sea water

To an aqueous solution of Ca and Ba chlorides comprising per liter 3 g Ca and 0.25 Ba there are added variable volumes of sea water and the barium that remains in solution is determined after standing for 5 days at room temperature.

In part of the test solutions there is introduced at the start a certain amount of the polyhydroxamic agent according to the invention having a molecular weight of 1,500 and 30% of hydroxamic groups.

The proportions of added agent, the same as the percents of sea water, are varied in the mixture of the latter with the calcium and barium solution.

| | mg agent | % sea water in the mixture | Ba in solution after 5 days mg/l |
|---|---|---|---|
| control | 0 | 50 | 1 |
| agent | 50 | 50 | about 4 |
| control | 0 | 5 | about 70 |
| agent | 20 | 5 | about 240 |

EXAMPLE 9

This example is conducted under the same conditions as Example 8 except that the temperature of aging and of preparation of the solutions is 50° C.

| | mg agent | % sea water in the mixture | Ba in solution after 5 days 50° (mg/l) |
|---|---|---|---|
| control | 0 | 5 | 79 |
| agent | 50 | 5 | 109 |
| control | 0 | 50 | 0.8 |
| agent | 50 | 50 | 3 |

It must be pointed out that these results are quantitatively somewhat less clear than observed cold. But qualitatively observation under a microscope shows that the crystals obtained in the presence of PHA are smaller and much less conglomerated. Therefore, they are less troublesome than those that form in the absence of this additive.

We claim:

1. A method of hindering the scaling of surfaces through the deposition thereon of alkaline earth compounds from a water containing the same, which comprises dissolving in the water a scale inhibiting amount of a member selected from the group of:

(a) a hydroxamic group bearing homopolymer having a molecular weight between 800 and 20,000, said hydroxamic group attached to a linear polyolefinic hydrocarbon chain, and (b) a hydroxamic group bearing copolymer, said hydroxamic group being attached to a linear polyolefinic hydrocarbon chain which is a copolymer with functional groups selected from the group consisting of acrylic acid, an acrylic ester, a salt of acrylic acid, maleic acid, a maleic ester, a salt of maleic acid, vinyl acetate, vinyl pyrrolidone, butadiene, styrene, and acrylonitrile, the proportions of hydroxamic groups to other functional groups being from 15 to 85 of the total of said hydroxamic and other functional groups, and said copolymer having a molecular weight between 800 and 7500.

2. The method according to claim 1, wherein said hydrocarbon chain is selected from the group consisting of polyvinylic, polyacrylic and polybutenylic.

3. A method according to claim 1, wherein said linear hydrocarbon chain, which bears hydroxamic groups, comprises a copolymer of the hydrocarbon with acrylic acid, an acrylic ester or a salt of acrylic acid.

4. A method according to claim 1, wherein said linear hydrocarbon chain which bears hydroxamic groups, comprises a copolymer of the hydrocarbon with maleic acid, a maleic ester or a salt of maleic acid.

5. A method according to claim 1, wherein said linear hydrocarbon chain which bears hydroxamic groups, comprises a copolymer of the hydrocarbon with units selected from the group consisting of vinyl acetate, vinyl pyrrolidone, butadiene, styrene and acrylonitrile.

6. A method according to claim 1, wherein at least one of the oxygen atoms in the hydroxamic functional group

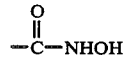

is replaced by a sulfur atom.

7. A method according to claim 1, wherein the concentration of the hydroxamic group bearing polymer is 1 to 50 mg per liter of water.

8. A method according to claim 1, wherein one or two hydrogen atoms in the —NHOH moiety of the hydroxamic group is substituted with $C_1$ to $C_6$ alkyl, phenyl or alkylaryls.

9. A method of hindering the scaling of surfaces in contact with a water which contains calcium compounds, barium compounds or calcium and barium compounds, through the deposition thereon of said compounds from the water, which comprises dissolving in the water 1 to 50 mg per liter of a polymer comprising polyacrylamide in which 15 to 85% of the amide groups are replaced by hydroxamic groups of the formula

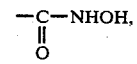

the molecular weight of the polymer being comprised between 1,000 and 20,000.

10. A method according to claim 9, wherein said polymer comprises a polyacrylamide in which 15 to 70% of the amide groups are replaced by hydroxamic groups.

11. A method according to claim 10, wherein at least one of the oxygen atoms in the hydroxamic functional group

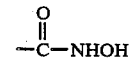

is replaced by a sulfur atom.

12. A method according to claim 10, wherein the degree of polymerisation in the polymer is 5 to 600.

13. A method according to claim 10, wherein the concentration of the polymer in the water treated is 0.5 to 10 mg per liter.

14. A method according to claim 12, wherein 2 to 5 mg of polymer is added to the water to be treated per 100 mg of Calcium present therein.

15. A method according to claim 9, wherein the molecular weight is 1,200 to 12,000.

16. A method according to claim 9, wherein the water is sea water.

* * * * *